United States Patent Office 3,671,218
Patented June 20, 1972

---

3,671,218
METHOD OF INHIBITING GROWTH OF UNWANTED VEGETATION
Erhard J. Prill, St. Louis, Mo., assignor to Monsanto Company, St. Louis, Mo.
No Drawing. Filed May 13, 1969, Ser. No. 824,312
Int. Cl. A01n 9/24
U.S. Cl. 71—115                           4 Claims

ABSTRACT OF THE DISCLOSURE

Herbicidal compositions comprising diphenylcarbamoyl halides of the formula

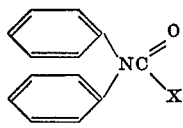

wherein X is a halogen selected from the group consisting of chlorine and bromine.

---

This invention relates to herbicidal compounds and methods for their use. More particularly, this invention relates to methods of inhibiting the growth of unwanted vegetation.

A purpose of this invention is to provide methods of inhibiting the growth of both grasses and broad leaf plants.

In accordance with this invention, it has been found that compounds of the following formula have valuable herbicidal activity

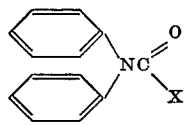

wherein X is a halogen selected from the group consisting of chlorine and bromine.

The compounds of the following invention were made according to the following examples, parts are by weight, unless otherwise noted:

EXAMPLE 1

Diphenylcarbamoyl chloride was prepared by the following procedure:

A suitable vessel equipped with mechanical stirring means, temperature measuring means, addition means, and containing 668 parts chloroform, was cooled to between 0° C. to 5° C. and charged with 84.5 parts pyridine and 169 parts freshly distilled diphenylamine. While maintaining a temperature range of about 0° C. to about 5° C., 104 parts of carbonyl dichloride (phosgene) was added to the mixture. During this operation the solution turned very dark in color.

The solvent chloroform was then removed by distillation and the residue extracted several times with ether. The ether extracts were combined and the ether removed by distillation to yield a solid material. This solid was dissolved in alcohol and treated with Norit, cooled, filtered, washed with cold alcohol, and then dried, yielding diphenylcarbamoyl chloride melting at 82 to 83.5° C. The yield was 95.7%.

EXAMPLE 2

The procedure of Example 1 was followed using carbonyl-dibromide in place of carbonyl-dichloride to obtain diphenylcarbamoyl bromide.

The general herbicidal activity of diphenylcarbamoyl chloride is demonstrated as follows:

EXAMPLE 3

A good grade of top soil is placed in aluminum pans and compacted to a depth of ⅜" to ½" from the top of each pan. A predetermined number of seeds of each of several plant species are placed on top of the soil in the pans.

The seeds are covered with a ⅜" layer of prepared soil and the pan leveled. The diphenylcarbamoyl chloride is applied by spraying the surface of the top layer of soil, prior to watering the seeds, with a solution containing a sufficient amount of active ingredient to obtain the equivalent of about 10 lbs./acre.

The seed containing pans are placed on a wet sand bench and maintained for approximately 14 days under ordinary conditions of sunlight and watering. The plants are observed at the end of approximately 14 days and the results recorded. The phytotoxic activity index is based on the average percent germination of each seed lot. The activity index is converted to a relative numerical scale for the sake of brevity and simplicity in the examples.

The pre-emergent herbicidal activity index used in the following table is defined as follows:

| Numerical scale: | Phytotoxic activity |
|---|---|
| 0 | No phytotoxicity. |
| 1 | Slight phytotoxicity. |
| 2 | Moderate phytotoxicity. |
| 3 | Severe phytotoxicity. |

The observed data is set forth in the following table wherein the botanical type is identified by an initial in accordance with the following code:

A—Wild oats         F—Soybean
B—Brome grass       G—Morning glory
C—Rye grass         H—Sugar beets
D—Crab grass        I—Foxtail
E—Pigweed           J—Sorghum

TABLE I

Pre-Emergent herbicidal activity

| Compound | (1) |
|---|---|
| Rate: lb./acre | 10 |
| Plant species: | |
| A | 3 |
| B | 3 |
| C | 3 |
| D | 3 |
| E | 3 |
| F | 0 |
| G | 2 |
| H | 0 |
| I | 3 |
| J | 3 |

[1] Diphenylcarbamoyl chloride.

The herbicidal compositions of this invention may contain either one of the diphenylcarbamoyl halides and a material referred to in the art as a herbicidal adjuvant in liquid or solid form. The herbicidal compositions are prepared by admixing the diphenylcarbamoyl halides with an adjuvant including diluents, extenders, carriers and conditioning agents to provide compositions in the form of finely-divided particulate solids, granules, pellets, and emulsions. Thus, the diphenylcarbamoyl halides can be used with an adjuvant such as a finely-divided particulate solid, a solvent liquid of organic origin, a wetting agent, dispersing agent, an emulsifying agent or any suitable combination of these.

Typical finely-divided solid carriers and extenders which can be used in the herbicidal compositions of this invention include for example, the talcs, clays, pumice, silica, diatomaceous earth, quartz, fuller's earth, salt, sulfur, powdered cork, powdered wood, walnut flour, chalk, tobacco dust, volcanic ash, and the like. Typical liquid diluents include for example, kerosene, Stoddard solvent, hexane, benzene, toluene, acetone, ethylene dichloride, xylene, diesel oil, and the like.

As mentioned hereinbefore the herbicidal compositions of this invention comprise a diphenylcarbamoyl halide and one or more herbicidal adjuvants which can be solid or liquid extenders, carriers, diluents, conditioning agents and the like. The preferred compositions comprise certain dust formulations, granules, and solutions in solvents. In general these preferred compositions can all contain one or more surface-active agents.

Surface-active agents which can be used in the herbicidal compositions of this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A.

Dust formulations contain a diphenyl carbamoyl halide and dense finely-divided particulate compositions which are intended for application to the soil in dry form. Dust formulations are characterized by their free-flowing and rapid settling properties so that they are not readily windborne to areas where they are of no value. The preferred formulations contain a dense, free-flowing, finely-divided particulate extender. Convenience in their manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for herbicidal dusts formulation include micaceous talcs, pyrophyllite, dense kaolin clays, ground calcium phosphate rock and tobacco dust. The dust formulations usually contain from about 0.5 to 99 parts of a diphenylcarbamoyl halide, 0 to 50 parts grinding aid, 0 to 3 parts of a wetting agent and 1 to 99.5 parts dense solid extender, all parts being by weight based on the total weight of the dust.

Granules are physically stable particulate compositions comprising active ingredient adhering to or distributed through a basic matrix of an inert, finely-divided particulate extender. In order to aid leaching of the diphenylcarbamoyl halide from the particulate, a surfactant can be present in the composition. Natural clays, pyrophyllites and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the phytotoxic granules.

The mineral particles which are used in the granular herbicidal compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal compositions of this invention generally contain from about 1 part to about 30 parts by weight of a diphenylcarbamoyl halide per 100 parts by weight of clay and 0 to about 5 parts by weight of a wetting agent per 100 parts by weight of clay. The preferred herbicidal granular compositions contain from about 5 parts to about 25 parts by weight of the diphenylcarbamoyl halide per 100 parts by weight of clay.

When operating in accordance with the present invention, effective amounts of the diphenylcarbamoyl halides are dispersed on or in the soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid herbicidal compositions to the surface of soil or to plant systems can be carried out by conventional methods, e.g., power dusters, boom and hand sprayers and spray dusters. The compositions can also be applied from airplanes as a dust or a spray.

The application of an effective amount of the diphenylcarbamoyl halides to the soil or growth media of plant systems is essential and critical for the practice of the present invention. The exact amount of the diphenylcarbamoyl halide to be employed is dependent upon the response desired in the plant as well as such other factors as the plant species and stage of development thereof, the specific soil and depth at which the active ingredients are distributed in the soil and the amount of rainfall. In applications to the soil, the diphenylcarbamoyl halides are applied in amounts from about 1 to about 25 or more pounds per acre. In such soil applications, it is desirable that the diphenylcarbamoyl halides be distributed to a depth of at least 0.2 inch and preferably in amounts from about 5 to about 10 pounds per acre. It is believed that one skilled in the art can readily determine from this specification, including examples, the application rate for any specific situation.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but compost, manure, muck, humus, sand and the like, adapted to support plant growth.

While the illustrative embodiments of the invention have been described hereinbefore with particularly, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A method of inhibiting the growth of unwanted vegetation which comprises applying to the area to be protected, a herbicidally effective amount of a compound of the formula:

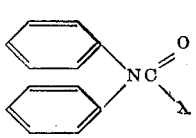

in which X is a halogen selected from the group consisting of chlorine and bromine.

2. A method according to claim 1 in which the compound is diphenylcarbamoyl chloride.

3. A method according to claim 1 in which the compound is diphenylcarbamoyl bromide.

4. A method according to claim 1 in which the unwanted vegetation is grass.

References Cited

UNITED STATES PATENTS 3,384,473    5/1968    Pillon et al. _____ 71—94 X

OTHER REFERENCES

Stevenson et al.: Chemical Abstract, vol. 58, col. 1870(g), 1963.

JAMES O. THOMAS, JR., Primary Examiner